No. 887,500.
PATENTED MAY 12, 1908.
C. L. McMURPHY.
COTTON PLANTER.
APPLICATION FILED JAN. 4, 1907.
2 SHEETS—SHEET 1.
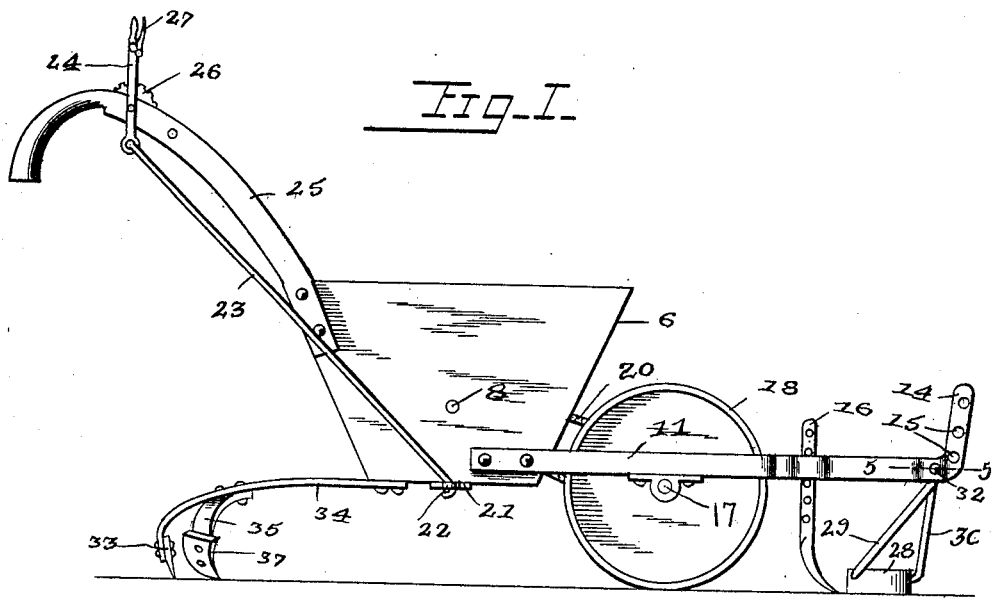
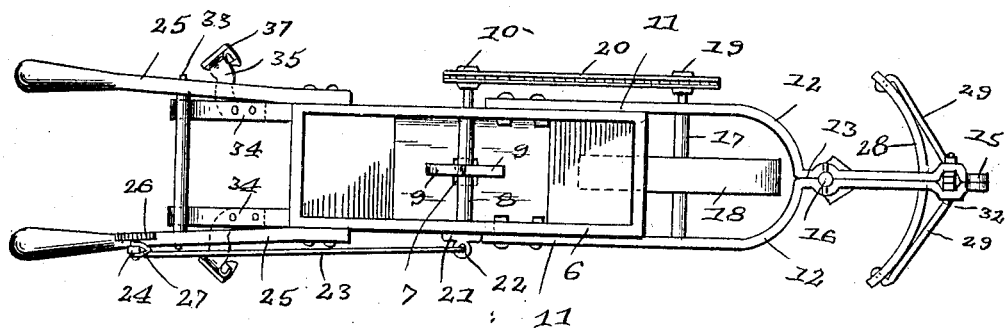

No. 887,500. PATENTED MAY 12, 1908.
C. L. McMURPHY.
COTTON PLANTER.
APPLICATION FILED JAN. 4, 1907.
2 SHEETS—SHEET 2.
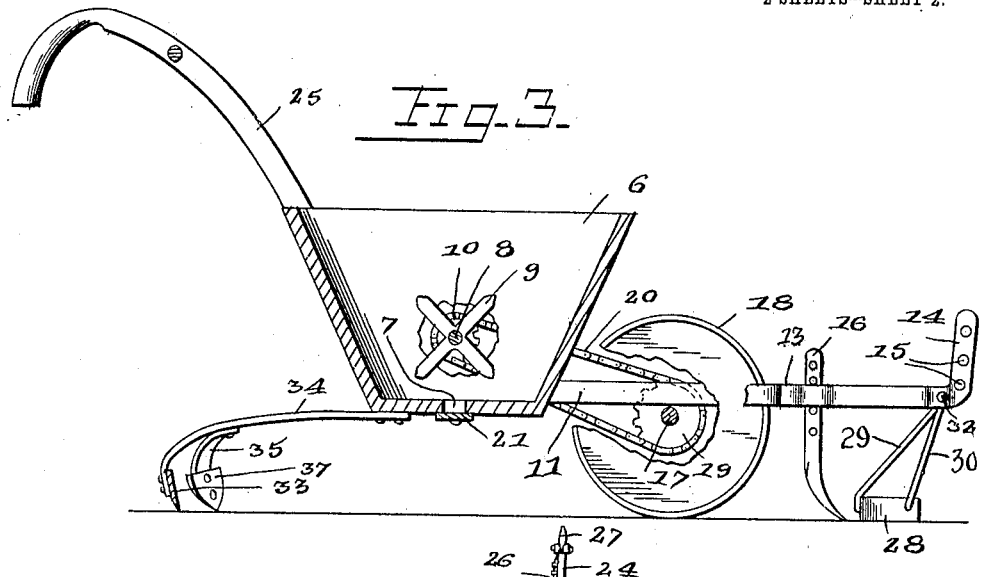
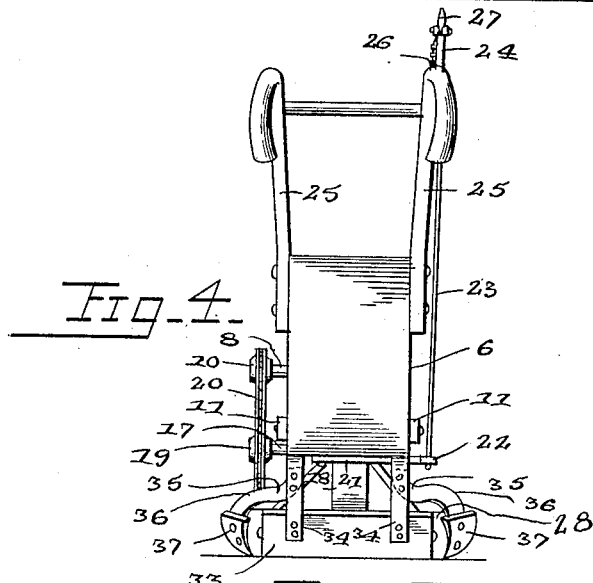
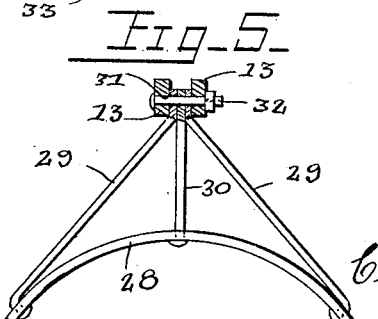
Witnesses
W. J. Rockwell
F. G. Smith
Inventor
Clifford L. McMurphy
By Chandler Chandler
Attorneys

UNITED STATES PATENT OFFICE.

CLIFFORD L. McMURPHY, OF HARTSFIELD, GEORGIA.

COTTON-PLANTER.

No. 887,500.         Specification of Letters Patent.         Patented May 12, 1908.

Application filed January 4, 1907. Serial No. 350,828.

*To all whom it may concern:*

Be it known that I, CLIFFORD L. MC-MURPHY, a citizen of United States, residing at Hartsfield, in the county of Colquitt, State of Georgia, have invented certain new and useful Improvements in Cotton - Planters; and I do hereby declare the following to be a full, clear, and exact description of the invention, such as will enable others skilled in the art to which it appertains to make and use the same.

This invention relates to seed planters and has for its object to provide in combination with the ordinary form of seed planter, means for smoothing the soil in advance of the travel of the seed planter and a novel means for covering the furrow made by the furrow opening after the seeds have been delivered from the hopper into the said furrow.

A common disadvantage found in seed planters now on the market resides in the fact that there is no simple means provided for leveling the ground in advance of the planter so as to render its travel and operation more smooth and efficient. Heretofore where no means has been provided to accomplish this result, the planted rows have been uneven, resulting in an unsightly field when the grain or cotton has grown to maturity.

In the accompanying drawings: Figure 1 is a side elevation of a planter constructed in accordance with my invention. Fig. 2 is a top plan view thereof. Fig. 3 is a detail vertical longitudinal sectional view therethrough. Fig. 4 is a rear elevation thereof. Fig. 5 is a detail vertical horizontal sectional view on the line 5—5 of Fig. 1, showing the forward soil-smoothing blade of the planter in top plan.

Referring more specifically to the drawings, the numeral 6 denotes the hopper of the planter which may be of any desired construction and which is provided in its bottom with the usual seed discharge opening 7.
Rotatably mounted in the hopper and transversely thereof is a beater shaft 8 carrying the usual beaters arms 9, and one end of the shaft extends beyond one side of the hopper and is provided with a sprocket gear 10 for a purpose to be presently described.

Secured at their rear ends to opposite sides of the hopper are beams 11 of bar metal and these beams extend forwardly for a portion of their length in parallel relation with respect to each other and are thence bent inwardly toward each other as at 12 and thence forwardly again as at 13, the said beams having their portions 13 bolted or otherwise secured to each other and bent upwardly as at 14 at their extreme forward ends to form the draft member of the planter, there beings openings 15 formed in the said upwardly directed portions 14 for the interchangeable connection of a clevis therewith.

Intermediate their inwardly bent portions 12 and the upturned portions 14, the portions 13 of the beams are arranged for the reception therebetween of the standard of a furrow opener 16, the said furrow opener being of any desired construction.

Rotatably journaled in the body portions of the beams 11 is a shaft 17 upon which is mounted a ground wheel 18 and a sprocket gear 19, the said sprocket gear being located upon one end of the shaft 17 and this end of the shaft being extended beyond the corresponding beam 11. A sprocket chain 20 is engaged over the sprocket gears 10 and 19 and serves to communicate motion from the shaft 17 to the beater shaft 8 within the hopper to feed the seeds contained therein through the seed discharge opening 7. In order that the size of the seed discharge opening 7 may be regulated to increase or lessen the quantity of seed discharged therethrough, a closure is provided for the same and the said closure comprises a plate 21 which is pivoted to one side of the opening and which has a portion 22 extending beyond that side of the hopper opposite to the side of the opening to which the plate is pivoted, and connected with the said portion 22 is one end of a rod 23, the other end of the rod being pivotally connected to the lower end of a lever 24 which is pivoted upon one of the handles 25 of the planter. A segmental rack 26 is carried by this handle and a hand-operated pawl 27 is carried by the lever 24 for engagement with the rack to hold the lever at different points of its rocking movement.

In order that the soil in advance of the planter during its travel may be smoothed or leveled to render the operation of the planter more efficient, I have provided a leveling blade which will now be described. The said blade is indicated by the numeral 28 and is curved in the arc of a circle with its convexed side presented forwardly, and the blade is supported by and beneath the portions 13 of the beam 11 by means of end and intermediate brace rods 29 and 30 respectively which are secured at their lower ends to the blade 28 and are provided at their upper ends with eyes 31 which are disposed between the portions 13 of the beams 11 and through which and the said portions of the beams 11 is engaged a bolt 32. This leveling blade above described is located in advance of the furrow opening 16 and also in advance of the ground wheel 18.

The furrow closer for the planter comprises a rigid blade 33 which is supported by means of resilient arms 34 which are secured at their forward ends to the under side of the hopper 6 of the planter at each side thereof and are extended rearwardly and downwardly and secured at their rear and lower ends in said blade 33. In order that dirt may be thrown into the furrow from opposite sides thereof to effectually cover the seeds deposited therein, plow standards 35 of resilient bar metal are secured one to each of the resilient arms 34 in advance of and above the blade 33, and the said standards are twisted as at 36 to cause shovels 37, which are secured thereto, to be presented forwardly and inwardly in order that soil may be thrown by the said shovels into the furrow.

During the travel of the machine, the soil-leveling blade 28 will level the soil in advance of the travel of the planter, and after the soil has been leveled a furrow will be made by the furrow opener 16. In this furrow will travel the ground wheel 18 of the planter and into the furrow will be discharged, from the hopper 6, the seeds contained therein. After the seeds have been thus deposited the soil upon opposite sides of the furrow will be thrown into the same by means of the shovels 37 and the soil thus deposited will be smoothed or leveled by means of the blade 33.

What is claimed is:—

A seed planter comprising a hopper, beams secured to opposite sides of the hopper and extending forwardly therefrom, said beams being brought together adjacent their forward ends and extended in this relation, a bearing formed between the beams, a furrow opener having a standard received in the bearing, rods provided at their upper ends with apertured ears which are received between the beams, a bolt received between the beams forwardly of the bearing for the furrow opener, bolts engaged through the beams and the ears, and a leveling blade to which the lower ends of the rods are secured, one adjacent each end and one at the middle, said leveling blade being curved forwardly in the arc of a circle.

In testimony whereof, I affix my signature, in presence of two witnesses.

CLIFFORD L. McMURPHY.

Witnesses:
W. J. PERRY,
G. W. BROWN.